United States Patent Office 3,773,767
Patented Nov. 20, 1973

3,773,767
N-(HYDROXY- OR METHOXY-ALKYL) - 2 - [N'-(HYDROXY OR METHOXY-ALKYL)-PHENYL-AMINO]-IMIDAZOLINES - (2) AND SALTS THEREOF
Helmut Stähle, Werner Kummer, Herbert Köppe, and Hans-Wolfgang Samtleben, Ingelheim am Rhein, Germany, assignors to Boehringer Ingelheim GmbH, Ingelheim am Rhein, Germany
No Drawing. Filed Mar. 29, 1971, Ser. No. 129,263
Claims priority, application Germany, Apr. 6, 1970, P 20 16 290.7
Int. Cl. C07d 49/34
U.S. Cl. 260—254        8 Claims

ABSTRACT OF THE DISCLOSURE

Compounds of the formula

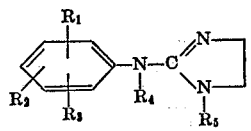

wherein $R_1$, $R_2$ and $R_3$, which may be identical to or different from each other, are each hydrogen, chlorine, fluorine, bromine, cyano, trifluoromethyl, alkyl of 1 to 3 carbon atoms or alkoxy of 1 to 3 carbon atoms, and
$R_4$ and $R_5$, which must be different from each other, are each hydrogen or

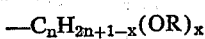

where
  R is hydrogen or methyl,
  $n$ is an integer from 1 to 6, inclusive, and
  $x$ is an integer from 1 to 3, inclusive, and non-toxic, pharmacologically acceptable acid addition salts thereof; the compounds as well as the salts are useful as hypotensives.

---

This invention relates to novel derivatives of N-hydroxyalkyl-2-phenylamino-imidazolines-(2) and non-toxic acid additions salts thereof, as well as to various methods of preparing these compounds.

More particularly, the present invention relates to a novel class of compounds represented by the formula

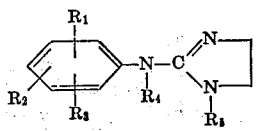

wherein $R_1$, $R_2$ and $R_3$, which may be identical to or different from each other, are each hydrogen, chlorine, fluorine, bromine, cyano, trifluoromethyl, alkyl of 1 to 3 carbon atoms or alkoxy of 1 to 3 carbon atoms, and
$R_4$ and $R_5$, which must be different from each other, are each hydrogen or

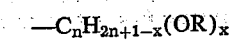

where
  R is hydrogen or methyl,
  $n$ is an integer from 1 to 6, inclusive, and
  $x$ is an integer from 1 to 3, inclusive, and non-toxic, pharmacologically acceptable acid addition salts thereof.

Within the genus defined by Formula I, a particularly preferred sub-generic class of compounds is that represented by the formula

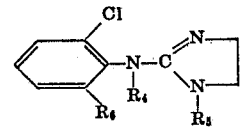

wherein $R_4$ and $R_5$ have the same meanings as in Formula I and $R_6$ is chlorine or methyl.

Other sub-genuses are those represented by the formulas

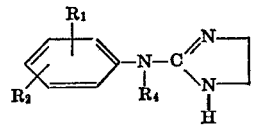

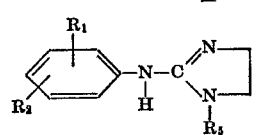

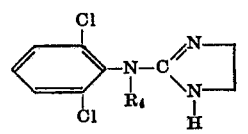

and

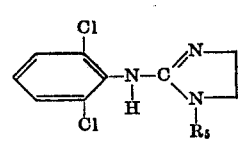

wherein $R_1$ is chlorine, bromine, trifluoro-methyl or cyano,
$R_2$ is hydrogen, methyl, chlorine or bromine,
$R_4$ is monohydroxy-alkyl of 1 to 4 carbon atoms, 2,3-dihydroxy-propyl or methoxy-methyl, and
$R_5$ is monohydroxy-alkyl of 1 to 6 carbon atoms, and non-toxic, pharmacologically acceptable acid addition salts thereof.

Species under these genuses are the following:

1 - (β - hydroxy - ethyl) - [(2',6' - dichloro - phenyl)-amino]-2-imidazoline;
2 - [N - methoxymethyl - N - (2',6' - dichloro - phenyl)-amino]-2-imidazoline;
2 - [N - (2',3' - dihydroxy - n - propyl - 1') - N - (2'',6''-dichlorophenyl)-amino]-2-imidazoline;
1 - hydroxymethyl - 2 - [(2',6' - dichloro-phenyl)-amino]-2-imidazoline;
2 - [N - (2' - hydroxy - n - propyl - 1') - N - (2'',6'' - dichloro-phenyl)-amino]-2-imidazoine;

and non-toxic, pharmacologically acceptable acid addition salts of each of these.

The compounds embraced by Formula I may be prepared by various methods involving well-known chemical principles, among which the following are particularly convenient and efficient.

METHOD A

By reacting a 2-phenylamino-imidazoline-(2) of the formula

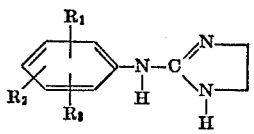

(II)

wherein $R_1$, $R_2$ and $R_3$ have the same meanings as in Formula I, with an oxyalkyl halide of the formula $$Hal-C_nH_{2n-x}(OH)_x \qquad (III)$$

wherein $R$, $n$ and $x$ have the meanings defined in connection with Formula I and Hal is chlorine, bromine or iodine; or with an aldehyde of the formula

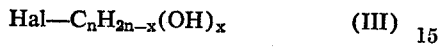

(IV)

wherein $R$, $n$ and $x$ have the same meanings as in Formula I; or with an epoxide of the formula

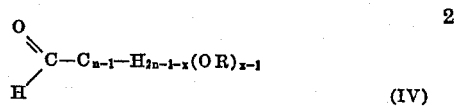

(V)

wherein $R$, $n$ and $x$ have the same meanings as in Formula I.

METHOD B

By reacting a substituted aniline of the formula

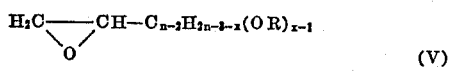

(VI)

wherein $R_1$, $R_2$ and $R_3$ have the same meanings as in Formula I, $R_4$ has the meanings defined in Formula I except hydrogen, and A is

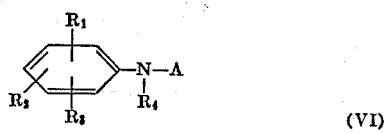

with ethylenediamine or an acid addition salt thereof.

METHOD C

By reacting a compound of the formula

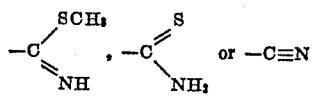

(VII)

wherein $R_1$, $R_2$ and $R_3$ have the same meanings as in Formula I, and X and Y, which may be identical to or different from each other, are each chlorine, bromine, alkylthio, alkoxy, amino or nitramino, with an ethylenediamine of the formula $$H_2N-CH_2-CH_2-NHR_5 \qquad (VIII)$$

wherein $R_5$ has the meanings defined in connection with Formula I except hydrogen.

METHOD D

By reacting a compound of the Formula I wherein at least one of $R_1$, $R_2$ and $R_3$ is hydrogen, with chlorine or bromine.

METHOD E

By hydrolizing a 2-phenylamino-imidazoline-(2) of the formula

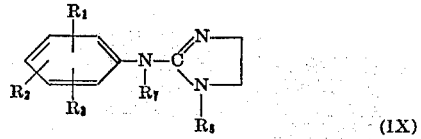

(IX)

wherein $R_1$, $R_2$ and $R_3$ have the same meanings as in Formula I, and $R_7$ and $R_8$, which must be different from each other, are each hydrogen or $$-C_nH_{2n+1-x}(OR)_{x-y}Z_y$$

where $R$, $n$ and $x$ have the same meanings as in Formula I, $y$ is an integer from 1 to 3, inclusive, $x-y$ is an integer from 0 to 2, inclusive, and Z is chlorine, bromine, iodine or acyloxy.

METHOD F

By ether cleavage of a 2-phenylamino-imidazoline-(2) of the formula

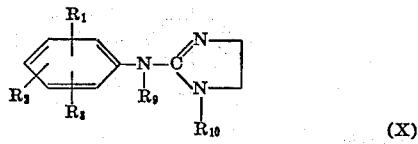

(X)

wherein $R_1$, $R_2$ and $R_3$ have the same meanings as in Formula I, and $R_9$ and $R_{10}$, which must be different from each other, are each hydrogen or $$-C_nH_{2n+1-x}(OH)_{x-y}(OR')_y$$

where $x$, $y$ and $n$ have the meanings defined in connection with Formula IX and R' is alkyl.

METHOD G

By hydrating a 2-phenylamino-imidazoline-(2) of the formula

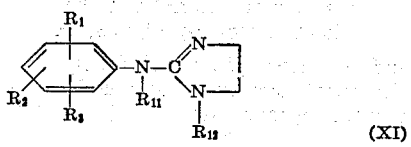

(XI)

wherein $R_1$, $R_2$ and $R_3$ have the same meanings as in Formula I, and $R_{11}$ and $R_{12}$, which must be different from each other, are each hydrogen or alkenyl of 1 to 6 carbon atoms.

METHOD H

By reducing a 2-phenylamino-imidazoline-(2) of the formula

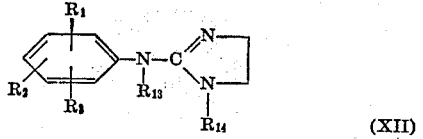

(XII)

wherein $R_1$, $R_2$ and $R_3$ have the same meanings as in Formula I, and $R_{13}$ and $R_{14}$, which must be different from each other, are each hydrogen, oxoalkyl of the formula $$-C_nH_{2n+1-x-z}(OR)_{x-z}O_z$$

where $R$, $n$ and $x$ have the meanings defined in connection with Formula IX, $z$ is an integer from 1 to 3, inclusive, and $x-z$ is an integer from 0 to 2, inclusive, or acyl of the formula $$-C_nH_{2n+1-x}(OR)_{x-y}(CO-W)_y$$

where $R$, $n$, $x$ and $y$ have the meanings defined in connection with Formula IX and W is chlorine, hydroxyl, alkoxy, or acyloxy, with catalytically activated hydrogen or a metal hydride.

METHOD I

By reacting a 2-phenylamino-imidazoline-(2) of the formula

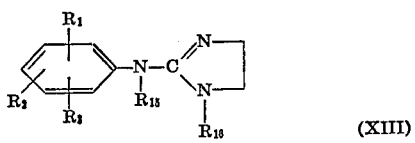

wherein $R_1$, $R_2$ and $R_3$ have the same meaning as in Formula I, and $R_{15}$ and $R_{16}$ are each alkyl radicals comprising carbonyl, ester, carboxyl, acid chloride or carboxyanhydride functions, with a Grignard reagent.

Depending upon the particular method of preparation which is employed, the reaction product of the Formula I has a hydroxyalkyl or methoxyalkyl substitutent attached either to the bridge nitrogen atom between the phenyl moiety and the imidazoline moiety or to the nitrogen atom in the imidazoline ring. The location of the substitution can be ascertained by means of NMR-spectroscopy. If the substitution is at the bridge nitrogen atom, the four methylene protons of the imidazoline ring show up as singulett at about 6.5 p.p.m. (τ-scale); whereas, if the substitution is at the nitrogen atom of the imidazoline ring, the NMR-spectrum shows a complex multiplett at about 6-7 p.p.m., instead of the singulett.

Thus, pursuant to method A, the reaction of a 2-phenylamino-imidazoline-(2) of the Formula II an oxyalkyl halide of the Formula III always yields a compound of the Formula I wherein $R_5$ is hydrogen and the bridge nitrogen is substituted; on the other hand, the reaction of a compound of the formula II with an aldehyde of the Formula IV always yields a compound of the Formula I wherein $R_4$ is hydrogen and the nitrogen atom in the imidazoline ring is substituted; finally, the reaction of a compound of the Formula II with an epoxide of the Formula V yields a compound of the Formula I which is substituted at the bridge nitrogen atom or at the ring nitrogen atom, depending upon the type of epoxide reactant and the reaction conditions.

The location of the oxyalkyl substitution in the reaction products of the Formula I obtained by methods B through I is necessarily predicted by the synthesis process in each case.

The compounds embraced by Formula I are organic bases and therefore form acid addition salts with inorganic or organic acids. Examples of non-toxic, pharmacologically acceptable acid addition salts are those formed with hydrochloric acid, hydrobromic acid, hydroiodic acid, hydrofluoric acid, sulfuric acid, phosphoric acid, nitric acid, acetic acid, propionic acid, butyric acid, caproic acid, valeric acid, oxalic acid, malonic acid, succinic acid, maleic acid, fumaric acid, lactic acid, tartaric acid, citric acid, malic acid, benzoic acid, p-hydroxybenzoic acid, p-aminobenzoic acid, phthalic acid, cinnamic acid, salicylic acid, ascorbic acid, methanesulfonic acid, 8-chlorotheophylline or the like.

The following examples further illustrate the present invention and will enable others skilled in the art to understand it more completely. It should be understood, however, that the invention is not limited solely to the particular examples given below.

EXAMPLE 1

2-[N-(2',3' - dihydroxy-n-propyl) - N - (2'',6''-dichlorophenyl) - amino] - imidazoline - (2) and its nitrate by method A A mixture consisting of 4.6 gm. (0.02 mol) of 2-[(2',6' - dichloro - phenyl) - amino] - imidazoline - (2), 7.5 cc. of 3-chloro-1,2-propanediol and 30 ml. of glycol monomethyl ester was heated for 9 hours on a boiling water bath. Thereafter, the reaction mixture was evaporated to dryness in vacuo, the viscous residue was dissolved in dilute (about 1 N) hydrochloric acid, and the solution was fractionally extracted with ether and chloroform at progressively higher pH values. The extracts from the extractions at >pH 7, which contained the free base, 2 - [N - (2',3' - dihydroxy - n - propyl) - N - (2'',6''-dichlorophenyl)-amino]-imidazoline-(2), were combined, dried over magnesium sulfate, treated with activated charcoal and acidified with concentrated nitric acid until acid reaction to Congo red, whereby 3.0 gm. of the nitrate of the base (40.8% of theory) precipitated out in white crystalline form. After recrystallization from methanol/ether, the nitrate of the formula

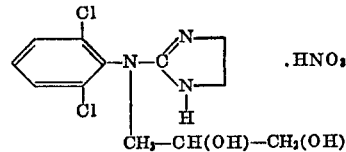

had a melting point of 101–102° C. The product was readily soluble in water and ethanol.

EXAMPLE 2

Using a procedure analogous to that described in Example 1, 35.3% of theory of 2-[N-(2',3'-dihydroxy-n-propyl) - N - (2'' - chloro - 4'' - methyl-phenyl)-amino]-imidazoline-(2) of the formula

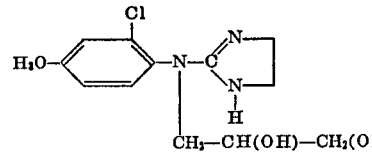

and its nitrate were obtained from 2-[(2'-chloro-4'-methyl-phenyl)-amino]-imidazoline-(2) and 3-chloro-1,2-propanediol.

EXAMPLE 3

1-(β-hydroxy-ethyl)-2-[(2',6'-dichloro-phenyl)-amino]-imidazoline-(2) and its hydrochloride by method C A mixture consisting of 18.2 gm. (0.05 mol) of N-(2,6-dichloro-phenyl) - S - methyl-isothiouronium hydroiodide, 7.8 gm. (150% of the stoichiometric amount) of N-(β-hydroxyethyl)-ethylenediamine and 100 ml. of isoamyl alcohol was heated to reflux temperature and held there for 12 hours. Thereafter, the clear reaction solution was evaporated to dryness in vacuo, and the viscous residue was dissolved in 0.5 N hydrochloric acid. The acid aqueous solution was fractionally extracted with ether at progressively larger pH values to separate the formed imidazoline base from unreacted starting material; the ether extracts obtained at pH >6.5 contained 2.0 gm. of base 1-(β-hydroxy-ethyl) - 2 - [(2',6'-dichloro-phenyl)-amino]-imidazoline-(2). The ethereal solution of the base was dried over anhydrous calcium sulfate, purified by treatment with activated charcoal, and acidified with ethereal hydrochloric acid until acid reaction to Congo red. The precipitate formed thereby was collected by vacuum filtration and dried, yielding the hydrochloride, M.P. 234–235° C., of the formula

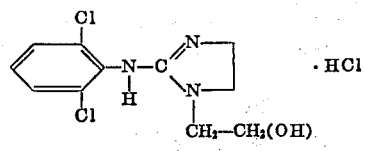

EXAMPLE 4

1-(β-hydroxy-ethyl)-2-[(2',4'-dichloro-phenyl)-amino]-imidazoline-(2) and its hydrochloride by method C A mixture consisting of 18.2 gm. (0.05 mol) of N-(2,4 - dichloro-phenyl) - S - methyl-isothiouronium hydroiodide, 7.8 gm. (150% of the stoichiometric amount) of N - (β - hydroxyethyl) - ethylenediamine and 50 ml. of methanol was refluxed for 14 hours. Thereafter, the resulting clear reaction solution was evaporated to dryness in vacuo, and the viscous residue was taken up in dilute hydrochloric acid. The acidic solution was vacuum-filtered through charcoal, and the colorless filtrate was fractionally extracted with ether at progressively higher pH values. The extracts containing the formed imidazoline base (pH >6.5; proof by thin-layer chromatography) were combined, dried over anhydrous calcium sulfate, and acidified with ethereal hydrochloric acid until weakly acid reaction, whereby 4.8 gm. (30.8% of theory) of 1 - (β - hydroxy-ethyl) - 2 - [(2',4' - dichloro-phenyl)-amino] - imidazoline - (2)hydrochloride, M.P. 163–165° C., of the formula

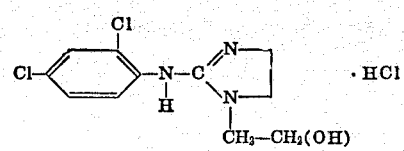

precipitated out.

EXAMPLE 5

Using a procedure analogous to that described in Example 4, 1-(β-hydroxy-ethyl) - 2 - [(3' - trifluoromethyl-phenyl)-amino]-imidazoline-(2), an oily substance, of the formula

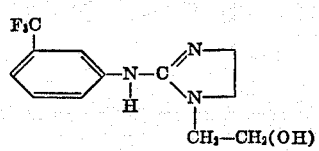

was prepared from N - (3 - trifluoromethyl-phenyl)-S-methylisothiouronium hydroiodide and N-(β - hydroxy-ethyl)-ethylene-diamine. The yield was 67.1% of theory.

EXAMPLE 6

Using a procedure analogous to that described in Example 4, 1-(β - hydroxy-ethyl) - 2 - [(4' - methoxy-phenyl)-amino]-imidazoline-(2), M.P. 121–123° C., of the formula

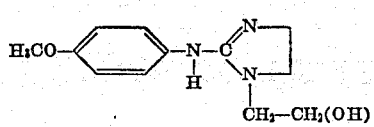

was prepared from N-(4-methoxy-phenyl)-S-methyl-isothiouronium hydroiodide and N-(β-hydroxy-ethyl)-ethylene-diamine. The yield was 40.4% of theory.

EXAMPLE 7

Using a procedure analogous to that described in Example 4, 1 - (β - hydroxy-ethyl)-2[(5' - chloro - 2'-methyl-phenyl)-amino]-imidazoline-(2) of the formula

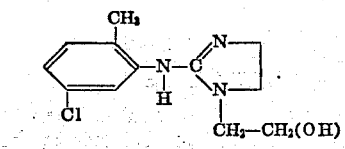

was prepared from N-(5 - chloro - 2 - methyl-phenyl)-S-methyl-isothiouronium hydroiodide and N-(β-hydroxy-ethyl)-ethylene-diamine. Its oxalate had a melting point of 169–170° C.

EXAMPLE 8

Using a procedure analogous to that described in Example 4, 1 - (β - hydroxy-ethyl) - 2 - [(2',4' - dibromo-phenyl)-amino]-imidazoline-(2) of the formula

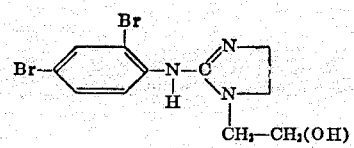

was prepared from N-(2,4 - dibromo-phenyl)-S-methyl-isothiouronium hydroiodide and N-(β-hydroxy-ethyl)-ethylene-diamine. Its picrate had a melting point of 177–178° C.

EXAMPLE 9

Using a procedure analogous to that described in Example 4, 1-(β-hydroxy-ethyl)-2-[(2'-chloro-4'-methyl-phenyl)-amino]-imidazoline-(2) of the formula

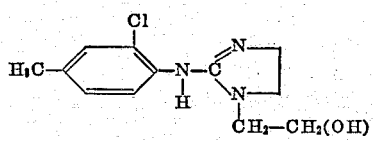

was prepared from N-(2-chloro - 4 - methyl-phenyl)-S-methyl-isothiouronium hydroiodide and N - (β-hydroxy-ethyl)-ethylenediamine. Its hydrochloride had a melting point of 180–182° C.

EXAMPLE 10

1 - (β - hydroxy - ethyl) - 2 - [(2' - chloro - 4'-methyl-phenyl)-amino]imidazoline-(2) and its hydrochloride by method C A mixture consisting of 5.2 gm. (0.05 mol) of N-(β-hydroxy-ethyl)-ethylenediamine and 50 ml. of absolute chloroform was added dropwise at 5° C. over a period of 40 minutes to a solution of 11.1 gm. (0.05 mol) of 2-chloro - 4 - methylphenylisocyanide dichloride in 50 ml. of absolute chloroform, and the resulting mixture was allowed to stand at room temperature overnight. Thereafter, the chloroform was evaporated in vacuo under gentle conditions, the residue was dissolved in 2 N hydrochloric acid, the resulting solution was purified by filtration through activated charcoal, and the filtrate was fractionally extracted with ether at progressively larger pH values. The ether extracts obtained at pH >7, which contained the imidazoline base, were combined, dried over magnesium sulfate, and acidified with ethereal hydrochloric acid until weakly acid reaction to Congo red. The resulting acidic solution was cooled for some time on an ice bath, whereby the hydrochloride of 1-(β-hydroxy-ethyl)-2-[(2'-chloro - 4' - methyl-phenyl)-amino]-imidazoline-(2), M.P. 182° C., crystallized out as a white crystalline substance.

EXAMPLE 11

Using a procedure analogous to that described in Example 10, 1-(β - hydroxy - ethyl) - 2 - [(4' - cyano-phenyl) - amino]imidazoline - (2), M.P. 126° C., of the formula

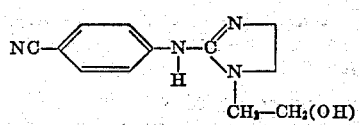

was prepared from 4-cyano-phenylisocyanide dichloride and N - (β - hydroxy-ethyl)-ethylenediamine. Its hydrochloride (yield: 9.7% of theory) had a melting point of 208–210° C.

EXAMPLE 12

1 - (β - hydroxy - ethyl) - 2 - [(2' - chloro - 4' - methyl-phenyl)-amino]imidazoline-(2) and its hydrochloride by method C A mixture consisting of (0.01 mol) of N' - (2 - chloro-4 - methyl - phenyl) - N''-nitro-guanidine (prepared by reacting 1.5 gm. of 2-chloro-p-toluidine with 1.5 gm. of N-methyl-N-nitroso - N' - nitro - guanidine pursuant to Adcock, J. Chem. Soc., 1965, 474), 1.1 gm. (0.01 mol) of N-(β-hydroxy-ethyl)-ethylenediamine and 20 ml. of absolute ethanol was refluxed for 8 hours, while stirring. Thereafter, the ethanol was evaporated in vacuo, the residue was taken up in dilute (about 2 N) hydrochloric acid, the insoluble matter was filtered off, and the filtrate was fractionally extracted with chloroform at progressively larger pH value. The extracts obtained at pH >7, which contained the imidazoline base, were combined, dried over anhydrous calcium sulfate, and the chloroform was evaporated in vacuo. The oily residue, 1-(β-hydroxy-ethyl)-2-[(2'-chloro - 4' - methyl-phenyl)-amino]imidazoline-(2), was dissolved in a small amount of absolute ether, and the resulting solution was acidified with ethereal hydrochloric acid until acid reaction to Congo red. The crystalline precipitate formed thereby was collected by vacuum filtration, washed and dried, yielding 0.1 gm. of 1-(β-hydroxy-ethyl)-2-[(2'-chloro-4'-methyl-phenyl) - amino]imidazoline - (2), M.P. 179–181° C.

EXAMPLE 13

2-[N-(methoxy-methyl)-N-(2',6'-dichloro-phenyl)-amino]-imidazoline-(2) by method A 2.3 gm. (0.01 mol) of 2 - [(2',6' - dichloro-phenyl)-amino]-imidazoline-(2) and 1.2 gm. (0.015 mol) of chloro-dimethylether were dissolved in 10 ml. of methanol, and the solution was refluxed for three hours. Thereafter, the methanol and the excess, unreacted chlorodimethylether were distilled off, and the residue was taken up in a small amount of water. The resulting aqueous solution was fractionally extracted with ether at progressive higher pH values, and upon evaporation of the extract obtained at pH 11–12, 0.6 gm. (22% of theory) of 2-[N-(methoxy-methyl) - N - (2',6'-dichloro-phenyl)-amino]-imidazoline-(2), M.P. 120–123° C., of the formula

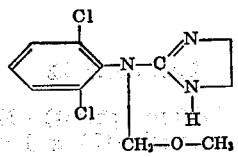

crystallized out.

EXAMPLE 14

Using a procedure analogous to that described in Example 13, 2-[N-(ethoxy-methyl)-N-(2',6' - dichloro - phenyl)-amino]-imidazoline-(2), M.P. 159–161° C., was prepared from 2 - [(2',6' - dichloro - phenyl) - amino]-imidazoline-(2) and chloromethyl ethyl ether.

EXAMPLE 15

1-(hydroxy-methyl)-2-[(2',6'-dichloro-phenyl)-amino]-imidazoline(2) by method A

A mixture consisting of 4.6 gm. (0.02 mol) of 2-[(2',6'-dichloro-phenyl)-amino] - imidazoline (2), 1.5 gm. of aqueous 40% of of formaldehyde (0.02 mol) and 25 ml. of methanol was heated in a sealed tube on a boiling water bath for 10 hours. Thereafter, the reaction mixture was evaporated to dryness in vacuo, the oily residue was taken up in dilute hydrochloric acid, and the acid aqueous solution was fractionally extracted with ether at progressively larger pH values; the stepwise increase of the pH was effected by addition of 2 N sodium hydroxide. The ether extracts which contained the desired reaction product (determination by thin-layer chromatography; solvent system: benzene:actone=9:1, Schlittler's reagent) were combined, dried over anhydrous calcium sulfate, and freed from ether. 0.85 gm. (10% of theory) of 1-hydroxymethyl)-2-[(2',6'-dichloro - phenyl)amino] - imidazoline-(2), M.P. 138–139° C., of the formula

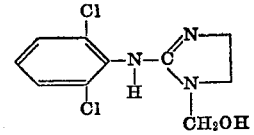

was obtained.

EXAMPLE 16

1-(β-hydroxy-ethyl)-2-[(2',6'-dichloro-phenyl)-amino]-imidazoline-(2) and its hydrochloride by method E A mixture consisting of 3 gm. of 1-(β-acetoxy-ethyl)-2-[(2',6'-dichloro - phenyl) - amino] - imidazoline - (2) hydrochloride (M.P. 200–203° C.) and 25 ml. of 2 N hydrochloric acid was refluxed for about 2 hours. Thereafter, the reaction mixture was evaporated in vacuo, and the residue was admixed with ether, whereby the hydrochloride of 1-(β-hydroxy - ethyl) - 2 - [(2',6' - dichloro-phenyl)-amino]-imidazoline-(2), M.P. 225–227° C., crystallized out. For purification, the hydrochloride was dissolved in water, and the aqueous solution was made alkaline with 2 N sodium hydroxide, whereby the free base was liberated, which was extracted with chloroform. The chloroform extract was acidified with ethereal hydrochloric acid, and the precipitate formed thereby was collected and recrystallized from butanol/ether. 0.9 gm. of 1-(β - hydroxy - ethyl) - 2 - [(2',6' - dichloro - phenyl)-amino]-imidazoline-(2) hydrochloride, M.P. 234–235° C., was obtained.

EXAMPLE 17

1-(β-hydroxy-ethyl)-2-[(2',6'-dichloro-phenyl)-amino]-imidazoline-(2) and its hydrochloride by method H A solution of 0.8 gm. of 1-(β-acetoxy-ethyl)-2-[(2',6'-dichloro-phenyl)-amino]-imidazoline - (2) in 40 ml. of absolute ether was slowly added dropwise to a mixture of 0.2 gm. of lithium aluminum hydride and 40 ml. of absolute ether, whereby the temperature of the mixture rose slightly. Thereafter, the reaction mixture was refluxed for three hours, then poured into ice water, and the aqueous mixture was fractionally extracted with ether at progressively larger pH values. The extracts containing the desired reaction product were combined, dried over magnesium sulfate, and then acidified with ethereal hydrochloric acid until acid reaction to Congo red. The precipitate formed thereby was collected by vacuum filtration and washed with absolute ether, yielding 0.6 gm. (81.6% of theory) of 1-(β-hydroxy - ethyl) - 2 - [(2',6' - dichloro-phenyl) - amino] - imidazoline-(2) hydrochloride, M.P. 234–235° C.

EXAMPLE 18

1-[(3'-hydroxy-2'-methyl-n-propyl-(1')]-2-[(2''-tolyl)-amino]-imidazoline(2) by method H A solution of 3.2 gm. of 1-[2'-(carbo-n-butoxy)-n-propyl-(1')]-2-[(2''-tolyl)-amino] - imidazoline - (2) in 40 ml. of absolute ether was slowly added dropwise to a mixture of 0.5 gm. of lithium aluminum hydride and 50 ml. of absolute ether at room temperature, while stirring, whereby the temperature of the mixture rose slightly. The reaction mixture was then refluxed for three hours, allowed to cool and admixed with an aqueous 20% solution of potassium sodium tartrate. The resulting mixture was made alkaline with sodium hydroxide, the imidazoline base liberated thereby was extracted with several portions of chloroform, and the extracts were combined, dried over magnesium sulfate, and the chloroform was evaporated in vacuo, leaving as the residue 2.3 gm. of thin-layer chromatographically and elemental-analytically pure 1-[3'-hydroxy-2'-methyl - n - propyl - (1')] - 2 - [(2'' - tolyl)-amino]-imidazoline-(2), a viscous oily substance, of the formula

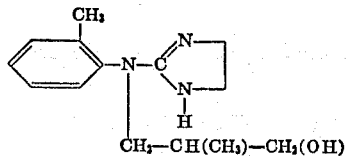

*Analysis.*—Calculated (percent): C, 67.99; H, 8.56; N, 16.99; O, 6.47. Found (percent): C, 67.90; H, 8.54; N, 16.07; O, 7.19.

EXAMPLE 19

2-[N-(2'-hydroxy-n-propyl-1')-N-(2'',6''-dichloro-phenyl)-amino]-imidazoline-(2) by method G A mixture consisting of 2.5 gm. of 2-[N-allyl-N-(2',6'-dichloro-phenyl)-amino]-imidazoline-(2) (M.P. 130–131° C.) and 50 ml. of aqueous 50% sulfuric acid was stirred for 10 hours at room temperature, then heated for 3–4 hours at 100° C.; and allowed to cool to room temperature. The resulting dark reaction mixture was adjusted to a pH of 10 with aqueous 50% potassium hydroxide while adding ice, extracted several times with chloroform, the extracts were combined and dried over magnesium sulfate, and the chloroform was evaporated therefrom. The residue was triturated with ether, whereby it crystallized throughout, and the crystals were collected by vacuum filtration and washed with ether, yielding 0.3 gm. (11.2% of theory) of 2-[N-(2'-hydroxy-n-propyl-1')-N-(2'',6''-dichloro-phenyl)-amino] - imidazoline-(2), M.P. 169–171° C., of the formula

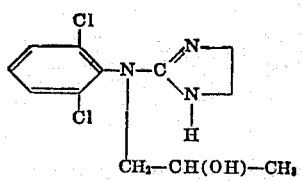

*Elemental analysis.*—Calculated (percent): C, 50.05; H, 5.24; N, 14.59; O, 5.56; Cl, 24.62. Found (percent): C, 50.07; H, 5.33; N, 14.27; O, 5.67; Cl, 24.64.

EXAMPLE 20

2-[N-(2',6'-dichloro-phenyl)-N-(β-hydroxy-ethyl)-amino]-imidazoline-(2) by method A A mixture consisting of 6.9 gm. (0.03 mol) of 2-(2',6'-dichloro-phenyl-amino)-imidazoline-(2), 10 ml. of ethylene oxide and 100 ml. of absolute benzene was heated for 8 hours at 120° C. Thereafter, the reaction mixture was evaporated in vacuo, the residue was taken up in dilute hydrochloric acid, the resulting acid solution was fractionally extracted with ether at progressively increasing pH values to remove impurities, and the desired reaction product was extracted with chloroform. The combined chloroform extracts were chromatographed on about 120 gm. of aluminum oxide (neutral, activity stage III), the pure eluate fractions were combined and evaporated in vacuo, and the oily residue was caused to crystallize by trituration with ether, yielding 2.5 gm. (30.1% of theory) of pure, white 2-[N-(2',6'-dichloro-phenyl)-N-(β-hydroxy-ethyl)-amino]-imidazoline-(2), M.P. 145–149° C., of the formula

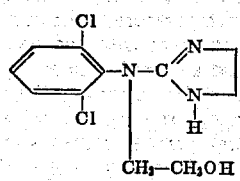

*Elemental analysis.*—C₁₁H₁₃Cl₂N₃O; mol. wt. 274.1. Calculated (percent): C, 48.20; H, 4.78; Cl, 25.87; N, 15.33; O, 5.84. Found (percent): C, 48.33; H, 4.64; Cl, 25.76; N, 15.23; O, 5.84.

EXAMPLE 21

1-[3'-hydroxy-2',3'-dimethyl - n - butyl-(1')]2-(2'',6''-dichlorophenyl-amino)-imidazoline-(2) and its hydrochloride by method I A solution of 5.3 gm. of 1-[2'-(carbo-n-butoxy)-n-propyl-(1')] - 2 - [(2'',6''-dichloro-phenyl)-amino]-imidazoline-(2) in 100 ml. of absolute ether was added dropwise to a gently refluxing Grignard reagent prepared from 1.74 gm. of magnesium, 11.2 gm. of methyl iodide and 100 ml. of absolute ether, and the reaction mixture was then refluxed for 2 hours more. Thereafter, the reaction mixture was decomposed with dilute hydrochloric acid and ice, the aqueous mixture was extracted several times with ether, and the ether extracts were discarded. The aqueous phase was now made alkaline with sodium hydroxide, and the precipitate formed thereby was centrifuged off and also discarded. The liquid phase was extracted repeatedly with chloroform, and the combined extracts were dried over magnesium sulfate and evaporated, leaving 2.3 gm. of a viscous, slightly yellow oil which was identified to be the raw free base 1-[3'-hydroxy-2',3'-dimethyl - n - butyl-(1')]-2-(2'',6''-dichlorophenyl-amino)-imidazoline-(2).

The base was converted with ethereal hydrochloric acid into its raw hydrochloride (M.P. 194–198° C.), which was purified by chromatography on aluminum oxide (neutral, activity stage III) with chloroform as the solvent. The thin-layer chromatographically uniform hydrochloride, M.P. 201–204° C., of the formula

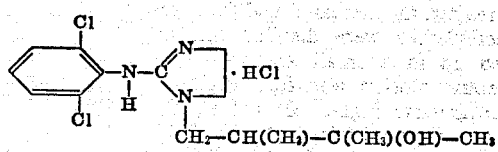

was obtained.

EXAMPLE 22

2 - [N - (2',6' - dichloro - phenyl) - N - (β - hydroxy-ethyl)-amino]-imidazoline-(2) and its hydrobromide by method F A mixture consisting of 3.0 gm. of 2-[N-(2',6'-dichloro-phenyl) - N - (β-hydroxy-ethyl)-amino]-imidazoline-(2) (M.P. 91–93° C.) and 30 ml. of aqueous 48% hydrobromic acid was refluxed for 4 hours on an oil bath. Thereafter, the reaction mixture was evaporated to dryness in vacuo, and the residue, which contained some unchanged starting material and 2-[N-(2',6'-dichloro-phenyl) - N - (β - hydroxyethyl)-amino]-imidazoline-(2) hydrobromide, was dissolved in water. The aqueous solution was fractionally extracted with ether at different pH values, and the free base was extracted with chloroform. Evaporation of the chloroform extracts yielded pure 2-[N - (2',6' - dichloro-phenyl) - N - (β - hydroxy-ethyl)-amino]-imidazoline-(2), M.P. 145–147° C., which proved to be thin-layer chromatographically identical to a known sample.

The compounds according to the present invention, that is, those embraced by Formula I and their non-toxic acid addition salts, have useful pharmacodynamic properties. More particularly, the compounds of the instant invention exhibit hypotensive activities in warm-blooded animals, such as rabbits, dogs and cats.

For pharmaceutical purposes the compounds according to the present invention are administered to warm-blooded animals perorally, enterally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective dosage unit of the compounds according to the present invention is from 0.0083 to 1.67 mgm./kg. body weight, preferably 0.05 to 0.5 mgm./kg. body weight.

Such dosage unit compositions may also contain an effective dosage unit of another hypotensive compound, such as a benzothiadiazine, and/or of active ingredients with another pharmacodynamic activity, such as spasmolytics, saluretics, dimetics, analgesics, hyperotics or the like.

The following examples illustrate a few dosage unit compositions comprising a compound of the present invention as an active ingredient and represent the best modes contemplated of putting the invention into practical use. The parts are parts by weight unless otherwise specified.

EXAMPLE 23

Coated pills

The pill core composition was compounded from the following ingredients:

| | Parts |
|---|---|
| 1 - ($\beta$ - hydroxy-ethyl)-2-[(2',6'-dichloro-phenyl)-amino]-imidazoline-(2)-hydrochloride | 15.0 |
| Lactose | 60.0 |
| Corn starch | 125.0 |
| Secondary calcium phosphate | 40.0 |
| Soluble starch | 3.0 |
| Colloidal silicic acid | 4.0 |
| Magnesium stearate | 3.0 |
| Total | 250.0 |

Preparation: The imidazoline compound was intimately admixed with the lactose, the corn starch, the calcium phosphate and the colloidal silicic acid, the resulting mixture was moistened with an aqueous solution of the soluble starch, the moist mass was granulated by forcing it through a fine-mesh screen, and the granulate was dried and admixed with the magnesium stearate. The resulting composition was compressed into 250 mgm.-pill cores, which were then coated with a thin shell consisting essentially of a mixture of sugar, talcum and gum arabic, and finally polished with beeswax. Each coated pill contained 15 mgm. of the imidazoline compound and was an oral dosage unit composition with effective hypotensive action.

EXAMPLE 24

Hypodermic solution

The solution was compounded from the following ingredients:

| | Parts |
|---|---|
| 2-[N-methoxymethyl - N - (2',6' - dichlorophenyl)-amino]-imidazoline-(2) hydroiodide | 2.0 |
| Sodium chloride | 18.0 |
| Distilled water, q.s. ad 2000.0 parts by vol. | |

Preparation: The imidazoline compound and the sodium chloride were dissolved in a sufficient amount of distilled water, the solution was diluted with additional distilled water to the indicated volume, the dilute solution was filtered until free from suspended particles, and the filtrate was filled into 2 cc.-ampules in an atmosphere of nitrogen and under aseptic conditions. The filled ampules were then sealed and sterilized for 20 minutes at 120° C. Each ampule contained 2 mgm. of the imidazoline compound and its contents were an intravenously injectable dosage unit composition with effective hypotensive action.

Analogous results were obtained when any one of the other imidazolines embraced by Formula I or a non-toxic acid addition salt thereof was substituted for the particular imidazoline in Examples 23 and 24. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to those skilled in the art that the invention is not limited to these particular embodiments, and that various changes and modifications may be made without departing from the spirit of the invention or the scope of the appended claims.

We claim:

1. A compound of the formula

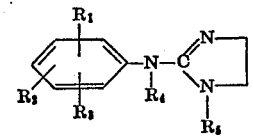

wherein
$R_1$, $R_2$ and $R_3$ are each hydrogen, chlorine, fluorine, bromine, alkyl of 1 to 3 carbon atoms or alkoxy of 1 to 3 carbon atoms, or one of them is cyano or trifluoromethyl and the others are hydrogen, and
$R_4$ and $R_5$ which must be different from each other, are each hydrogen or $$-C_nH_{2n+1-x}(OR)_x$$

where
R is hydrogen or methyl,
$n$ is an integer from 1 to 3, inclusive, provided that, when $x$ and $n$ are integers greater than 1, the OR-substituents are attached to different carbon atoms of $-C_nH_{2n+1}$ moiety, or a non-toxic, pharmacologically acceptable acid addition salt thereof.

2. A compound of the formula

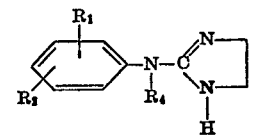

or

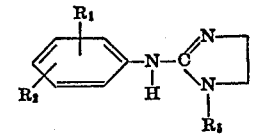

wherein
$R_1$ is chlorine, bromine, trifluoromethyl or cyano,
$R_2$ is hydrogen, methyl, chlorine or bromine,
$R_4$ is monohydroxy-alkyl of 1 to 4 carbon atoms, 2,3-dihydroxy-propyl or methoxymethyl, and
$R_5$ is monohydroxy-alkyl of 1 to 6 carbon atoms, or a non-toxic, pharmacologically acceptable acid addition salt thereof.

3. A compound of the formula

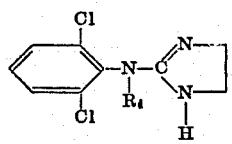

or

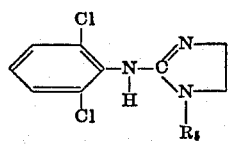

wherein
R₄ is monohydroxy-alkyl of 1 to 4 carbon atoms, 2,3-dihydroxy-propyl or methoxymethyl, and
R₅ is monohydroxy-alkyl of 1 to 6 carbon atoms,
or a non-toxic, pharmacologically acceptable acid addition salt thereof.

4. A compound according to claim 3, which is 1-(β-hydroxy-ethyl) - 2 - [(2',6' - dichloro - phenyl)-amino]-imidazoline-(2) or a non-toxic, pharmacologically acceptable acid addition salt thereof.

5. A compound according to claim 3, which is 2-[N-methyloxymethyl - N - (2',6' - dichloro-phenyl)-amino]-imidazoline-(2) or a non-toxic, pharmacologically acceptable acid addition salt thereof.

6. A compound according to claim 3, which is 2-[N-(2',3' - dihydroxy - n - propyl-1') - N - (2'',6'' - dichloro-phenyl)-amino]-imidazoline-(2) or a non-toxic, pharmacologically acceptable acid addition salt thereof.

7. A compound according to claim 3, which is 1-hydroxymethyl - 2 [(2',6' - dichloro - phenyl - amino]-imidazoline-(2) or a non-toxic, pharmacologically acceptable acid addition salt thereof.

8. A compound according to claim 3, which is 2-[N-(2'-hydroxy-n-propyl-1') - N - (2'',6'' - dichloro-phenyl)-amino]-imidazoline-(2) or a non-toxic, pharmacologically acceptable acid adidtion salt thereof.

References Cited
FOREIGN PATENTS

| | | | |
|---|---|---|---|
| 1,448,765 | 7/1966 | France | 260—309.6 |
| 1,506,407 | 11/1967 | France | 260—309.6 |
| 1,506,408 | 11/1967 | France | 260—309.6 |
| 796,997 | 6/1958 | Great Britain | 260—309.6 |
| 1,016,514 | 1/1966 | Great Britain | 260—309.6 |
| 1,034,938 | 7/1966 | Great Britain | 260—309.6 |

OTHER REFERENCES

McKay et al.: Chem. Abst., vol. 52, col. 7288 (1958).
Reisner et al.: Chem. Abst., vol. 72, No. 55335e (1970).
Tronche et al.: Chem. Abst., vol. 55, col. 11396 (1961).
Tuzun: Chem. Abst., vol. 70, No. 573,325j (1969).

NATALIE TROUSOF, Primary Examiner

U.S. Cl. X.R.
260—309.6, 348 R, 565, 566 D, 602; 424—253, 273